United States Patent [19]

Williams et al.

[11] Patent Number: 4,789,399

[45] Date of Patent: Dec. 6, 1988

[54] PRESSURIZED ROLLER PENS AND INKS FOR SUCH PENS

[75] Inventors: Raymond S. Williams, Boulder City; Paul C. Fisher, 711 Yucca St., Boulder City, Nev. 89005

[73] Assignee: Paul C. Fisher, Boulder City, Nev.

[21] Appl. No.: 920,429

[22] Filed: Oct. 20, 1986

Related U.S. Application Data

[63] Continuation-in-part of Ser. No. 701,509, Feb. 14, 1985, abandoned, which is a continuation-in-part of Ser. No. 548,554, Nov. 3, 1983, abandoned, which is a continuation of Ser. No. 240,187, Mar. 3, 1981, abandoned.

[51] Int. Cl.[4] .................... C09D 11/00; C09D 11/02; C09D 11/16
[52] U.S. Cl. ........................................ 106/20; 106/22; 106/23; 106/25; 106/30; 401/190; 401/212; 260/DIG. 38
[58] Field of Search ...................... 106/20, 25, 22, 23, 106/30; 401/190, 212; 260/DIG. 38

[56] References Cited

U.S. PATENT DOCUMENTS 3,425,779  2/1969  Fisher et al. .................. 401/190

*Primary Examiner*—John Kight
*Assistant Examiner*—M. L. Moore
*Attorney, Agent, or Firm*—Seiler, Quirk & Tratos

[57] ABSTRACT

A pressurized roller pen includes a thixotropic viscoelastic ink that is a gel at rest, but becomes a thin liquid under the shearing action of the pen's revolving ballpoint. This ink includes a polyacrylic resin polymer, at least one highly polar solvent, at least one solvent of low or medium polarity, and colloidal silica, together with pigments, dyes, surfactants and/or pH modifiers.

10 Claims, No Drawings

PRESSURIZED ROLLER PENS AND INKS FOR SUCH PENS

RELATIONSHIP TO OTHER APPLICATIONS

This application is a continuation-in-part of application Ser. No. 701,509, filed Feb. 14, 1985 abandoned, which is a continuation-in-part of application Ser. No. 548,554, filed Nov. 3, 1983 abandoned, which was a continuation of application Ser. No. 240,187, filed Mar. 3, 1981, both now abandoned.

BACKGROUND OF THE INVENTION

This invention relates to highly thixotropic ball-point inks having very low viscosities under writing conditions. These inks are particularly useful for computer plotter pens, which must travel at high speeds and change direction frequently and quickly.

Ball-point pens containing low viscosity inks have been commercially available since 1948. Because they write easily with little pressure and produce intense, opaque lines, they have attained commercial acceptance. Manufacturing such pens to uniform quality standards is difficult, however, for these reasons: (1) because their ink reservoirs are open to the atmosphere, their inks tend to evaporate, reducing shelf life; (2) because capillary action feeds ink to the ball of such pens, any break in the capillary ink channels from the reservoir to the ball of such pens causes them to stop writing; (3) sometimes, inks flow too rapidly from their reservoirs causing excessive ink to accumulate on the point of the pens; and (4) the absorbent felt-type ink reservoirs in these pens have small capacities.

Our new pressurized ball-point roller pens with their new inks overcome these problems. Because our ink cartridges are sealed, the inks cannot evaporate or dry out. Because our ink cartridges are pressurized, the inks feed dependably without requiring capillary action. Because our inks are gels while at rest, and because our inks are highly adhesive and viscoelastic, our inks do not ooze, and excessive ink seldom accumulates around the ball tip. Because our ink reservoirs are sealed and pressurized, they can hold a large quantity of usable ink.

SUMMARY OF THE INVENTION

An ink formulation for a pressurized ball point pen comprises a polyacrylic resin, a first highly polar solvent, colloidal silica, and a second solvent having less than high polarity.

DESCRIPTION OF A PREFERRED EMBODIMENT

Our invention provides pressurized ball-point roller pens that write more easily than other pressurized ball-point pens, such as those disclosed in Fisher et al, U.S. Pat. No. 3,425,779, and almost as easily as unpressurized roller pens. The new inks form gel structures at rest, but become thin liquids that flow easily, yet adhere to the ball of the pen, under the shearing action of the pen's revolving ball. These new inks include at least one polyelectrolyte polymer which is a polyacrylic resin polymer, at least one highly polar solvent, colloidal silica, at least one low or medium polarity solvent having a dielectric constant at 25° C., of less than 35, and preferably less than 25, and other such ink ingredients as pigments, dyes, pH modifiers, pigment modifiers, thixotropy modifiers and surfactants. As subsequently explained, the polyelectrolyte polymer and high-polarity solvent form a first rheological system, and the lower polarity solvent and colloidal silica form a second rheological system which coacts with the first system to provide a fluid which is highly viscous at rest and extremely fluid under shear conditions.

The polyelectrolyte polymers generally have a number average molecular weight of at least about 300,000, and preferably of at least about 3,000,000. Examples of such polymers include Acrysol ASE 60, available from Rohm & Haas Company and Carbopol 934 available from B. F. Goodrich Company. Especially preferred is the carboxyvinyl polymer Carbopol 934. In our ink compositions, these polyelectrolyte polymers constitute about 1% to about 6% by weight, preferably about 2% by weight of the ink.

Supplements for the Carbopol 934 and Acrysol ASE 60 resins include polyvinyl methyl ethers such as Gantrez, available from GAF. These supplements are not substitutes for the polyelectrolyte polymers, but can be added to our inks to improve their yield value, among other things.

The new inks must contain at least 5% by weight of one or more highly polar solvents, meaning solvents with dielectric constants at about 25° C., of greater than about 35. Among these highly polar solvents are water, glycerol, dimethylformamide, formamide, and ethylene glycol. The amount of highly polar solvent in our inks varies depending on the nature of the polyelectrolyte polymer, and on the nature and quantity of the other ink ingredients. However, such solvents can constitute from about 5% to about 65% by weight, preferably 15-30%, of the inks.

The new inks must also include at least one low polarity or medium polarity solvent having a dielectric constant of less than about 35. Such solvents include diethylene glycol; dipropylene glycol; ethylene glycol phenyl ether; toluene; polyethylene and polypropylene glycols of a molecular weight of about 200 to about 1500 available from Union Carbide Company and Dow Chemical Company; stearic acid; oleic acid; and benzyl alcohol. These solvents are used in amounts that vary depending on the nature of the colloidal silica, and the nature and relative amounts of the other ink constituents. Broadly, such solvents can constitute from about 1% to about 55%, preferably 15-40%, by weight of the inks.

The colloidal silicas in our inks include fumed silica or hydrated silica, and, in particular, the fumed silica sold under the tradename Cab-O-Sil M5 by Cabot Corporation. The quantity of colloidal silica in our inks should be in the range of about 1% to about 10%, preferably 1.5-4%, by weight of the ink composition.

Our inks preferably also include surfactants, or wetting agents, to promote hydrogen bonding of silicas. An example is Triton X100 available from Rohm & Haas Company, which is a non-ionic wetting agent well-known for use with colloidal silicas. The quantity of surfactant used is in the range of about 0.1% to about 5% by weight of the ink composition, preferably from 0.15-3%.

Our inks may also include thixotropy modifiers such as resins such as polyvinyl methyl ethers such as Gantrez, available from G.A.F., and Phtalopal N.P., available from B.A.S.F., in the amounts ranging from about 0.5% to about 10% by weight of the ink compositions.

Our inks may also include pigments, pigment modifiers, dyes and pH modifiers. Pigments useful in our ink compositions are Cyan Blue BNF 55-3750, available from American Cyanamid; Bonadur Red 20-6440, available from American Cyanamid; Elftex 5 Carbon Black, available from Cabot Corporation; Chrome Yellow 40-4500, available from American Cyanamid; Mogul L Carbon Black, available from Cabot Corporation; and Methyl Violet MV 55-2919, available from American Cyanamid. Preferably, such pigments are combined with protective pigment modifiers such as polyvinyl pyrrolidone K30. Pigments and pigment modifiers, where present, can constitute up to about 20% by weight of our inks. These materials help to coat pigment particles to prevent flocculation.

Among the dyes useful in our ink compositions are Victoria Blue B.O. Base, available from American Cyanamid; Spirit Blue THN, available from American Cyanamid; Chrysoidine Y Base, available from American Cyanamid; Spirit Red 2G, available from American Cyanamid; Zapon Fast Fire Red B, available from B.A.S.F.; Spirit Yellow TG, available from American Cyanamid; Nigrosine base, available from American Cyanamid; Rhodamine base DY, available from American Cyanamid; and Spirit Orange 2G, available from American Cyanamid. Because the polyelectrolyte polymers are acidic, base dyes provide a means for neutralizing our ink compositions. Neutralization is essential to gelling our inks, which preferably have a pH in the range of about 6.7 to about 8. Where the nature or amount of the dyes is insufficient to form a gel, we can also use pH modifiers such as amines to neutralize the inks. Examples of such materials are diisopropanolamine and di-ortho-tolylguanadine. Dyes, where present, constitute up to about 30% by weight of our inks.

To make our new ink compositions, we simply blend the ink constituents in the proper relative amounts in a blender until the desired gel forms. More preferably, we first combine the surfactants, solvents and thixotropy adjusters, then add the other constituents in the following order: polyelectrolyte polymer; colloidal silicas; pigments and pigment modifiers, if any; dyes, if any; and pH modifiers, if any.

Our new ink compositions have substantial yield values when at rest, and tend to resist flow under the force of gravity or under the large pressures within the pressurized reservoirs of our pens. However, under the tremendous shearing forces of the revolving ball in the ball point, our inks drop in viscosity to less than about 40,000 cps measured with a Brookfield HBT Viscometer using a No. 6 spindle at 25° C. at 100 rpm, and preferably into the range of about 100 to about 4,000 centipoise under actual writing conditions (although viscosities cannot be accurately measured under these conditions).

For these pressurized roller pen inks the level of thixotropicity under operating conditions, which we define by a "Thixotropic Ratio", is much higher than that of other pressurized ball-point pen inks. As measured by the following procedure, the Thixotropic Ratio of inks of the invention varies from a low of 10:1, preferably at least 25:1, to a high of 150:1, measured with a Brookfield HBT Viscometer at 25° C. using either a No. 6 or No. 7 spindle. We determined the "Thixotropic Ratio" by measuring the viscosity of the ink at 25 degrees C. with a spindle revolving at a slow speed of 0.5 revolutions per minute and comparing that with the viscosity of the same ink with the spindle revolving at a faster speed of 100 revolutions per minute. We used a Brookfield HBT Viscometer with either a No. 6 or No. 7 spindle; the same spindle should be used at both fast and slow speeds to calculate the Ratio. The Thixotropic Ratio is calculated by dividing the viscosity at slow speed by the viscosity at high speed.

Our new inks also have sufficient adhesion and cohesion so that they adhere to the ball of the pen when the ball is revolving at very high rates of speed, yet transfer readily from the ball onto the writing surface.

Pressurized ball-point writing cartridges typically include a tubular, rigid ink reservoir with a ball-point structure joined to the lower end of the reservoir. The ball-point structure includes a writing ball mounted in a ball socket. The ink itself is fed into the reservoir, pressurized with an inert gas such as nitrogen or air to a pressure in excess of 1 to about 15 atmospheres, and then sealed to prevent escape of the gas from the reservoir. At rest, our inks are gels that do not ooze from the reservoir. Under the shearing force of the ball when the pen is in use, the viscosities of our inks become sufficiently low that the ball rotates easily in its socket and deposits an intense line of ink onto the writing surface.

The initial viscosity of inks of the invention should be between about 40,000 cps and 3,000,000 cps, preferably from about 200,000 cps to about 500,000 cps, when measured with a Brookfield HBT viscometer, 25° C., No. 6 or No. 7 spindle at 0.5 rpm. For the same ink at 100 rpm, the inks have a viscosity of from about 6,000 cps to about 70,000 cps, preferably from about 10,000–40,000 cps. Because of the high Thixotropic Ratios of these inks, and the relatively low viscosities at high shear, the inks require considerably less pressure for rotation of the ball member, and leave a heavier, more intense line than inks described in the prior art. Inks deposited by pressurized pens according to the invention are described as "watery", even though they are highly viscous at rest. While the absolute viscosity of the ink at 0.5 rpm and 100 rpm are not critical and are controllable by adjustment of ingredients, the high Thixotropic Ratio ensures that at the very high shear conditions existing in use of the pen, the ink will have a very low viscosity. These inks are particularly useful for plotter pens, which must leave a clear trace with very rapid changes of direction and low pressure on the ball.

The reason for the improved performance of the inks of the invention is believed to be attributable to a unique combination of two complementary rheological systems. The first system comprises solvent-expanded gel coils of a polyacrylic resin polymer. The second system comprises hydrogen-bonded chains of colloidal silica. These systems are believed to interrelate as follows.

The first system is a soft "gel" formed from the polyacrylic resin polymer and a highly polar solvent. The polymer coils are referred to as "gel coils" which are soft and easily deformable as a result of the solvent absorbed into the interior of the coils. The coils are analogous to a pile of individual chains which are largely separated but periodically contact each other, and which can be stretched or drawn out so as to extend generally parallel to each other The spacing, or interstices, between the molecules is occupied with the second rheological system (as well as the other ink components).

The second rheological system is, in a chemical sense, believed to be an entirely separate gel system from the first system. This system consists of a three-dimensional network of particle chains of silica colloidally dispersed in a solvent having a dielectric constant of less than about 35. This gel has significantly different properties than the first system. It will support a static shear stress, and will not undergo permanent deformation. It has a shear modulus of rigidity similar to a solid, but in other respects has characteristics of a liquid.

The two systems cooperate to provide a highly desirable set of properties in a pressurized pen. The second system is, in effect, "carried" by the first system when the ink is present in bulk, and then itself serves as a carrier for holding the first system as it is subjected to shear thinning around the writing ball and immediately thereafter as the first system develops its initial physical properties. These functions are achieved by the formation of chains of colloidal silica formed by hydrogen bonding completely penetrating the interstices and surrounding the gel coils in the first system. Accordingly, under the conditions of high shear occurring at the writing ball, the particle chains of the second system are effective to retain the viscosity, cohesiveness, and adhesiveness of the first system at levels above which would be experienced in the absence of the second system, imparting to the ink a sufficient resistance to shear thinning to enable deposition of a coherent, intense line.

A particularly preferred ingredient is a non-ionic or anionic surfactant which acts as a potentiator for the colloidal silica gel system, providing increased viscosity and more stability to the gel. Any surfactant functional in a non-high-polarity solvent system may be acceptable. For the silica gel system in a non-polar solvent, or a solvent of low to medium polarity, a non-ionic or anionic surfactant is used. An example is Triton X-100, a non-ionic surfactant sold by Rohm & Haas.

With the combination of rheological systems, the inks can be formulated to be very highly thixotropic, which enables a resting condition which precludes "weep" and a writing condition that produces low viscosity to provide line intensity, ink penetration, and good flow. However, the detriments of a highly thixotropic ink, namely, thinning on shear which produces blobs, skips, and poor ball adhesion is prevented by the system of the invention.

EXAMPLES

Following our preferred formulation method, we prepared the following new inks, and then loaded them into pressurized cartridge ball-point pens. These ball-point pens have the ball and socket structure set forth at column 4, lines 32 and following, in U.S. Pat. No. 3,425,779, which issued Feb. 4, 1969.

In each cartridge, we used air or nitrogen as the pressurizing gas, and pressurized each cartridge to about 90 pounds per square inch.

We calculated the thixotropic ratio of each ink formulation from apparent viscosity measurements taken with the Brookfield HBT viscometer using a No. 6 or No. 7 spindle at about 25° C. These results appear in each example.

EXAMPLE 1

Blue Ink

| Constituents | Percent by Weight |
| --- | --- |
| Butyrolactone (GAF) | 21.36 |
| Propylene Glycol | 18.90 |
| Glycerine | 9.70 |
| Distilled Water | 5.80 |
| Surfactant Triton X100 (Rohm & Haas) | 0.48 |

-continued

| Constituents | Percent by Weight |
| --- | --- |
| Polyglycol P1200 (Dow) | 1.94 |
| Polyacrylic Resin Carbopol 934 (Goodrich) | 1.94 |
| Polyvinyl Pyrrolidone K30 (BASF) | 2.91 |
| Pigment Cyanblue BNF 55-3750 (Cyanamid) | 3.92 |
| Stearic Acid (Emery Co.) | 3.92 |
| Dye Victoria Blue B.O. Base (Cyanamid) | 3.92 |
| Dye Spirit Blue THN (Cyanamid) | 16.50 |
| Dye Calco Methyl Violet Base (Cyanamid) | 5.90 |
| Cab-O-Sil M5 Fumed Colloidal Silica(Cabot) | 1.94 |
| Di-o-tolylguanadine (DuPont) | 0.97 |
| | 100.00 |

We tested the viscosities of this ink on a Brookfield HBT viscometer with a No. 6 spindle at 25° C., at the following rotation speeds (RPM) and obtained the following viscosities (cps):

| RPM | Centipoises (cps) |
| --- | --- |
| 0.5 | 2,960,000 |
| 1.0 | 1,640,000 |
| 2.5 | 816,000 |
| 5.0 | 416,000 |
| 10.0 | 200,000 |
| 20.0 | 128,000 |
| 50.0 | 48,000 |
| 100.0 | 30,400 |

Thixotropic ratio: 97:1

EXAMPLE 2

Blue Ink

| Constituents | Percent by Weight |
| --- | --- |
| Dimethylformamide | 41.0 |
| Glycerine | 14.0 |
| Distilled Water | 6.0 |
| Surfactant Triton X100 (Rohm & Haas) | 0.5 |
| Polyglycol P1200 (Dow) | 2.0 |
| Polyacrylic Resin Carbopol 934 (Goodrich) | 2.0 |
| Polyvinyl Pyrrolidone PVP K30 (BASF) | 3.0 |
| Pigment Cyanblue BNF 55-3750 (Cyanamid) | 6.0 |
| Pigment Bonadur Red 20-6440 | 1.0 |
| Stearic Acid (Emery Co.) | 3.0 |
| Dye Victoria Blue B.O. Base (Cyanamid) | 2.5 |
| Dye Methyl Violet Base DY (Cyanamid) | 4.0 |
| Dye Spirit Blue THN (Cyanamid) | 13.0 |
| Cab-O-Sil M5 (Cabot Co.) | 2.0 |
| | 100.0 |

We tested the viscosities of this ink on a Brookfield HBT viscometer with a No. 6 spindle at 25° C., at the following rotation speeds (RPM) and obtained the following viscosities (cps):

| RPM | Centipoises (cps) |
| --- | --- |
| 0.5 | 512,000 |
| 1.0 | 352,000 |
| 2.5 | 188,800 |
| 5.0 | 115,200 |
| 10.0 | 71,200 |
| 20.0 | 44,200 |
| 50.0 | 23,000 |
| 100.0 | 14,750 |

Thixotropic ratio: 34.7:1

EXAMPLE 3

Black Ink

| Constituents | Percent by Weight |
|---|---|
| Dimethylformamide | 42.0 |
| Glycerine | 13.0 |
| Distilled Water | 2.0 |
| Surfactant Triton X100 (Rohm & Haas) | 0.5 |
| Polyglycol E200 (Union Carbide) | 2.0 |
| Polyacrylic Acid Resin Carbopol 934 (Goodrich) | 2.0 |
| Polyvinyl Pyrrolidone K30 (BASF) | 3.0 |
| Carbon Black Elftex 5 (Cabot Corp.) | 6.0 |
| Pigment Cyanblue BNF 55-3750 (Cyanamid) | 2.0 |
| Pigment Bonadur Red 20-6440 (Cyanamid) | 1.0 |
| Pigment Chrome Yellow 40-4500 (Cyanamid) | 0.5 |
| Stearic Acid (Emery Co.) | 4.0 |
| Cab-O-Sil M5 (Cabot Co.) | 3.0 |
| Dye Calco Blue Base N (Cyanamid) | 6.0 |
| Dye Methyl Violet Base DY (Cyanamid) | 6.0 |
| Dye Chrysoidine Y Base (Cyanamid) | 2.5 |
| Dye Spirit Red 2G (Cyanamid) | 3.0 |
| Dye Spirit Yellow TG (Cyanamid) | 1.5 |
| | 100.0 |

We tested the viscosities of this ink on a Brookfield HBT viscometer with a No. 7 spindle at 25° C., at the following rotation speeds (RPM) and obtained the following viscosities (cps):

| RPM | Centipoises (cps) |
|---|---|
| 0.5 | 1,360,000 |
| 1.0 | 928,000 |
| 2.5 | 550,400 |
| 5.0 | 345,400 |
| 10.0 | 218,400 |
| 20.0 | 141,600 |
| 50.0 | 67,840 |
| 100.0 | 45,920 |

Thixotropic ratio: 29.6:1

EXAMPLE 4

Black Ink

| Constituents | Percent by Weight |
|---|---|
| Diethylene Glycol | 28.0 |
| Benzyl Alcohol | 15.0 |
| Glycerine | 10.0 |
| Distilled Water | 4.0 |
| Triton X100 (Rohm & Haas) | 0.5 |
| Polyglycol E300 (Union Carbide) | 2.0 |
| Polyacrylic Acid Resin Carbopol 934 (Goodrich) | 2.0 |
| Stearic Acid | 3.0 |
| Carbon Black Elftex 5 (Cabot Co.) | 4.0 |
| Polyvinyl Pyrrolidone K30 (BASF) | 2.0 |
| Di-o-tolylguanadine | 1.0 |
| Dye Calco Blue Base N (Cyanamid) | 8.4 |
| Dye Calco Methyl Violet Base DY (Cyanamid) | 8.4 |
| Dye Calco Nigrosine Base BPS | 1.4 |
| Dye Calco Chrysoidine Y Base | 4.4 |
| Dye Zapon Fast Fire Red B (BASF) | 3.4 |
| Hi-Sil T-600 (PPG Industries, Inc.) | 2.0 |
| Di-isopropanolamine | 0.5 |
| | 100.0 |

We tested the viscosities of this ink on a Brookfield HBT viscometer with a No. 6 spindle at 26° C., at the following rotation speeds (RPM) and obtained the following viscosities (cps):

| RPM | Centipoises (cps) |
|---|---|
| 0.5 | 352,000 |
| 1.0 | 224,000 |
| 2.5 | 184,000 |
| 5.0 | 96,000 |
| 10.0 | 60,000 |
| 20.0 | 36,000 |
| 50.0 | 18,000 |
| 100.0 | 9,600 |

Thixotropic ratio: 36:1

EXAMPLE 5

Black Ink

| Constituents | Percent by Weight |
|---|---|
| Methanol | 17.9 |
| Butyrolactone | 31.2 |
| Glycerine | 9.3 |
| Distilled Water | 2.2 |
| Surfactant Triton X100 (Rohm & Haas) | 0.8 |
| Polyglycol P1200 (Dow) | 1.5 |
| Pigment Cyanblue BNF 55-3750 (Cyanamid) | 2.9 |
| Pigment Bonadur Red 20-6440 | 1.5 |
| Carbon Black Elftex 5 (Cabot Co.) | 4.3 |
| Polyvinyl Pyrrolidone K30 (BASF) | 2.2 |
| Stearic Acid (Emery Co.) | 2.9 |
| Dye Calco Blue Base N (Cyanamid) | 3.6 |
| Dye Calco Methyl Violet Base DY (Cyanamid) | 3.6 |
| Dye Calco Chrysoidine Y Base | 1.5 |
| Dye Spirit Red 2G | 1.8 |
| Dye Spirit Yellow TG | 0.4 |
| Acrysol ASE 60 (Rohm & Haas) | 6.0 |
| Cab-O-Sil M5 (Cabot Co.) | 5.0 |
| Di-o-tolylguanadine | 1.4 |
| | 100.0 |

We tested the viscosities of this ink on a Brookfield HBT viscometer with a No. 6 spindle at 25° C., at the following rotation speeds (RPM) and obtained the following viscosities (cps):

| RPM | Centipoises (cps) |
|---|---|
| 0.5 | 720,000 |
| 1.0 | 320,000 |
| 2.5 | 144,000 |
| 5.0 | 80,000 |
| 10.0 | 44,000 |
| 20.0 | 26,000 |
| 50.0 | 12,000 |
| 100.0 | 6,800 |

Thixotropic ratio: 106:1

EXAMPLE 6

Red Ink

| Constituents | Percent by Weight |
|---|---|
| Butyrolactone | 29.0 |
| Glycerine | 9.0 |
| Distilled Water | 15.0 |
| Surfactant Triton X100 (Rohm & Haas) | 0.5 |
| Polyglycol E200 (Union Carbide) | 5.0 |
| Polyacrylic Acid Resin Carbopol 934 (Goodrich) | 2.0 |
| Polyvinyl Pyrrolidone K30 (BASF) | 3.0 |
| Pigment Bonadur Red 20-6440 (Cyanamid) | 6.0 |
| Cab-O-Sil M5 (Cabot Co.) | 2.0 |
| Stearic Acid (Emery Co.) | 3.0 |
| Dye Spirit Red 2G (Cyanamid) | 16.0 |

-continued

| Constituents | Percent by Weight |
|---|---|
| Dye Spirit Orange 2G (Cyanamid) | 2.0 |
| Dye Rhodamine Base DY (Cyanamid) | 4.0 |
| Di-o-tolylguanadine (DuPont) | 1.0 |
| Di-isopropanolamine (Union Carbide) | 2.5 |
| | 100.0 |

We tested the viscosities of this ink on a Brookfield HBT viscometer with a No. 7 spindle at 25° C., at the following rotation speeds (RPM) and obtained the following viscosities (cps):

| RPM | Centipoises (cps) |
|---|---|
| 0.5 | 1,240,000 |
| 1.0 | 704,000 |
| 2.5 | 371,000 |
| 5.0 | 249,000 |
| 10.0 | 153,600 |
| 20.0 | 97,600 |
| 50.0 | 59,520 |
| 100.0 | 38,720 |

Thixotropic ratio: 32:1

We claim:

1. A ball-point marking instrument including a sealed marking fluid reservoir having a socket located at one end thereof; a ball rotatably mounted within said socket so as to extend into the interior of and to the exterior of said reservoir; a marking fluid within said fluid reservoir in contact with said ball; a charge of pressurized gas within said reservoir at the extremity remote from the socket, said pressurized gas serving to force said marking fluid against said ball, said marking fluid comprising from about 1% to about 6% by weight of a polyacrylic resin polymer, at least about 5% by weight of at least one solvent of high polarity, at least one solvent of low or medium polarity, about 1% to about 10% colloidal silica, and at least one coloring agent, said marking fluid having a thixotropic ratio in the range of about 25:1 to about 150:1 measured on a Brookfield HBT viscometer at 25° C., using either a No. 6 or No. 7 spindle, and a viscosity less than about 40,000 cps measured with a Brookfield HBT viscometer using a No. 6 spindle at 25° C. at 100 rpm.

2. The ball-point marking instrument of claim 1 wherein said highly polar solvent is selected from the group consisting of water and glycerol.

3. The ball-point marking instrument of claim 1 wherein the marking fluid further comprises at least one member selected from the group consisting of pH modifiers, pigment modifiers, thixotropy modifiers and surfactants.

4. An ink composition comprising a polyacrylic resin polymer, glycerol, at least one solvent of low or medium polarity, colloidal silica, a non-ionic or anionic surfactant, and at least one coloring agent, said marking fluid having a thixotropic ratio in the range of about 25:1 to about 150:1 measured on a Brookfield HBT viscometer at 25° C., using either a No. 6 or No. 7 spindle, and a viscosity less than about 40,000 cps measured with a Brookfield HBT viscometer using a No. 6 spindle at 25° C. at 100 rpm.

5. The ink composition of claim 4 including at least one highly polar solvent.

6. The ink composition of claim 4 wherein the ink composition further comprises at least one member selected from the group consisting of pH modifiers, pigment modifiers, thixotropy modifiers and surfactants.

7. The instrument of claim 1 wherein the polymer has a number average molecular weight of at least about 300,000.

8. The instrument of claim 1 wherein the polymer has a number average molecular weight of at least about 3,000,000.

9. The ink of claim 4 also containing from 0.1–5% of a non-ionic surfactant.

10. The ink of claim 4 wherein the viscosity measured on a Brookfield HBT viscometer using either a No. 6 or No. 7 spindle at 25° C. at 0.5 rpm is from about 200,000 cps to about 500,000 cps.

* * * * *